US008320677B2

(12) United States Patent
Fosseide et al.

(10) Patent No.: US 8,320,677 B2
(45) Date of Patent: Nov. 27, 2012

(54) METHOD FOR PROCESSING OPTICAL CHARACTER RECOGNITION (OCR) OUTPUT DATA, WHEREIN THE OUTPUT DATA COMPRISES DOUBLE PRINTED CHARACTER IMAGES

(75) Inventors: Knut Tharald Fosseide, Kolbotn (NO); Hans Christian Meyer, Oslo (NO)

(73) Assignee: Lumex AS, Oslo (NO)

( * ) Notice: Subject to any disclaimer, the term of this patent is extended or adjusted under 35 U.S.C. 154(b) by 315 days.

(21) Appl. No.: 12/744,985

(22) PCT Filed: Nov. 24, 2008

(86) PCT No.: PCT/NO2008/000422
§ 371 (c)(1),
(2), (4) Date: Jul. 7, 2010

(87) PCT Pub. No.: WO2009/070033
PCT Pub. Date: Jun. 4, 2009

(65) Prior Publication Data
US 2011/0052064 A1    Mar. 3, 2011

(30) Foreign Application Priority Data

Nov. 30, 2007    (NO) .................................. 20076178

(51) Int. Cl.
*G06K 9/18* (2006.01)
(52) U.S. Cl. ........................ 382/182; 382/181; 382/112
(58) Field of Classification Search .................. 382/181, 382/182, 231, 100, 112, 114, 135, 140
See application file for complete search history.

(56) References Cited

U.S. PATENT DOCUMENTS

| | | | | |
|---|---|---|---|---|
| 5,689,585 A | * | 11/1997 | Bloomberg et al. | 382/229 |
| 5,768,414 A | * | 6/1998 | Jamali | 382/173 |
| 5,809,166 A | * | 9/1998 | Huang et al. | 382/178 |
| 6,111,984 A | | 8/2000 | Fukawase | |
| 6,473,524 B1 | * | 10/2002 | Reda et al. | 382/195 |
| 2004/0146216 A1 | * | 7/2004 | Andel et al. | 382/277 |
| 2008/0063279 A1 | * | 3/2008 | Vincent et al. | 382/182 |

OTHER PUBLICATIONS

Min-Chuijung et al. "Machine printed character segmentation method using side profiles",Systems, Man, and Cyernetics,1999. IEEE SMC'99 Conference Proceedings. 1999 IEEE International Conferenceon Tokyo, Japan Oct. 12-15, 1999, vol. 6, p. 863-867, ISBN0-7803-5731-0.
Lu Y,"Machine printed character segementation—an overview", Pattern Recognition, Jan. 1, 1995, Elsevier, GB, vol. 28, No. 1, p. 67-80, ISSN0031-3203.
International Search Report, issued Mar. 10, 2009, for PCT International Application No. PCT/NO2008/000422.
Written Opinion, issued Mar. 10, 2009, for PCT International Application No. PCT/NO2008/000422.

* cited by examiner

*Primary Examiner* — Bhavesh Mehta
*Assistant Examiner* — Edward Park
(74) *Attorney, Agent, or Firm* — Pearl Cohen Zedek Latzer, LLP

(57) ABSTRACT

The present invention is related to a method of processing of output data from an Optical Character Recognition (OCR) system, wherein the output data comprises images of double printed characters. The method identifies the respective members of a suspected double printed character image by first providing a set of single character template images from images of characters identified in the text being processed by the OCR system, then combining the single character templates providing candidate models for the suspected double printed character image. Correlation between each respective candidate model and the suspected double printed character image provides an indication of which pair of modelled single template character images that most probable are the correct identification of the respective character images in the double printed character image.

5 Claims, 4 Drawing Sheets ed that the subject has been appointed
pp[y]¹ Corporation, Inc., and organization
e hundred twenty wholesale drug houses
 and are located in various states been favored with the subject's accou[nt]⁵
 have been satisfactory. In view of t[he]³
k stated that the company would not
ommodation and that only once has it
or a small amount on a letter of credit
it had never acquainted itself closely
ore no financial details were availab[le]²
subject is an importer of Norwegian
horitative source that the company is a
  trade circles the company is well
various houses interviewed that in
h the subject terminated satisfactori[ly]⁴
ys for its own account credit has been

Fig. 1 abcdefghikl mnoprstuwy

Fig. 2

METHOD FOR PROCESSING OPTICAL CHARACTER RECOGNITION (OCR) OUTPUT DATA, WHEREIN THE OUTPUT DATA COMPRISES DOUBLE PRINTED CHARACTER IMAGES

CROSS-REFERENCE TO RELATED APPLICATIONS

This application is a National Phase Application of PCT International Application No. PCT/NO2008/000422, International Filing Date Nov. 24, 2008, claiming priority of Norwegian Patent Application No 20076178, filed Nov. 30, 2007, each of which which are hereby incorporated by reference in their entirety.

FIELD OF THE INVENTION

The present invention is related to a method for resolving contradicting output data from an Optical Character Recognition (OCR) system, and especially to a method for processing OCR output data, wherein the output data comprises unrecognizable character images due to double printing of at least two character instances overlaid each other.

BACKGROUND OF THE INVENTION

Optical character recognition systems provide a transformation of pixelized images of documents into ASCII coded text which facilitates searching, substitution, reformatting of documents etc. in a computer system. One aspect of OCR functionality is to convert handwritten and typewriter typed documents, books, medical journals, etc. into for example Internet or Intranet searchable documents. Generally, the quality of information retrieval and document searching is considerably enhanced if all documents are electronically retrievable and searchable. For example, a company Intranet system can link together all old and new documents of an enterprise through extensive use of OCR functionality implemented as a part of the Intranet (or as part of the Internet if the documents are of public interest).

However, the quality of the OCR functionality is limited due to the fact that the complexity of an OCR system in itself is a challenge. It is difficult to provide an OCR functionality that can solve any problem encountered when trying to convert images of text into computer coded text. One such problem is due to imprint of at least two characters on top of each other, or with an offset between them, which may be encountered in typewriter printed documents. The printing arms or printing wheels or similar typewriter mechanisms may have some mechanical faults that provides a misalignment when the arms or the printing wheel, the paper etc. is shifted to a new position, which may result in a movement along the text line that is too small compared to the actual width of the character, resulting in a misaligned printing of the characters on a text line.

The effect of such double printed images is that the OCR system is unable to recognize the respective character images in the double printed images, and convert them to correct ASCII characters, for example. Usually, OCR systems provide output data comprising a list of uncertainly recognized characters with a measuring of the degree of uncertainty or certainty that respective characters have been recognized. This value is sometimes referred to as a score value, as known to a person skilled in the art. Such double printed character images will therefore be identifiable as such, and their position on a text page, in words etc., can be identified. However, the respective unrecognizable double printed character images must be distinguished from unrecognizable single character images.

SUMMARY OF THE INVENTION

According to an aspect of the present invention, such unrecognizable double printed character images will have a score value that is far away from any other unrecognizable single character. The reason is that the double printed character image really do not represent an image of a single character that the OCR system is able do identify. Therefore the resulting score value will be low. A single character image, even though reported as unrecognizable, will most probable somehow resemble a character instance. Therefore the score value will be higher than for unrecognizable double character imprints.

According to yet another aspect of the present invention, monospace characters will provide a measure for character width, for example, as a fixed number of pixels along the text line direction. Therefore, if the number of pixels of a suspected double printed character image is not a whole multiple of this pixel number, it will indicate a double printed character image.

It is within the scope of the present invention to use any method that can detect double printed character images as outlined here.

According to an example of embodiment of the present invention, a set of template images are created from images of characters from the document itself identified by the OCR system as having an image quality above a certain predefined level. These template images are then used one by one in a gliding image process, wherein a template image is moved across a suspected double printed character image. The suspected double printed character image is bounded by a bounding box surrounding the image, and the movement is inside this bounding box, wherein the movement is stepwise, for example, one pixel step a time. A correlation is performed for each step of movement. The correlation provides two types of data: the correlation value and an ordered set of numbers indicating a displacement or offset between the respective image bodies relative to the bounding box. Then template images with local maximum correlation values are combined to resemble the suspected double printed image creating a set of candidate images. This alignment is possible since the correlation provides the displacement or offset between images as well. Then the respective candidate images are correlated with the actual double printed image. The maximum correlation identified in this manner indicates the pair of combined template images that are substantially equal the suspected double printed image. The combined template image provides then the identification of the respective characters comprised in the suspected double printed character image.

According to an example of embodiment of the present invention, the process of combining template images involves identifying contributions to the combined images from each respective template image bounded by respective bonding boxes. There exist many possible solutions to identify the respective contributions. For example, if a region of the combined image only will receive pixel values from one of the template images, the pixels from the relevant template image is used in this region. If both images will contribute to a region, the image comprising the darkest pixel values (grey level coding) will contribute to the region.

According to yet another aspect of the present invention, the template images may improve the performance of the present invention if images of characters are grouped together in character classes. For example, the OCR system may report many instances of images of a same character as being recognized certainly above a preset threshold level. All such images of the same character is then added together by adding the grey level of each respective corresponding character pixel after alignment of the character image bodies, and weighting the sum with the number of added images. This aspect of the present invention enhances the graphical quality of the respective images of the template characters, first by being images of real images as encountered in a document, and secondly by averaging noise components through the addition and weighting of the pixel values, as known to a person skilled in the art.

BRIEF DESCRIPTION OF THE DRAWINGS

FIG. 1 illustrates an example of typewriter text comprising double printed character images.

FIG. 2 illustrates a set of template character images created from images of characters recognized in the text depicted in FIG. 1 having a score value above a certain value.

DETAILED DESCRIPTION OF THE INVENTION

Figure 2:
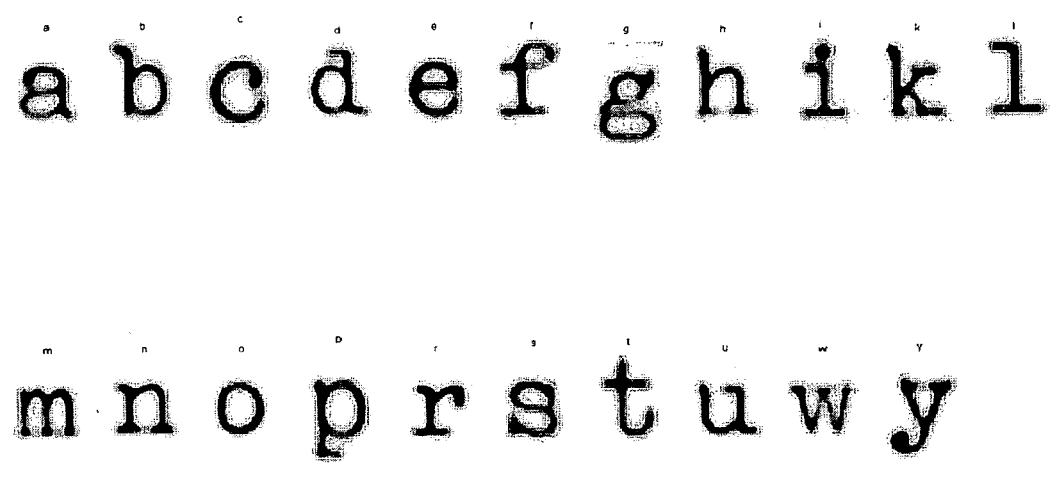
Figure 3:
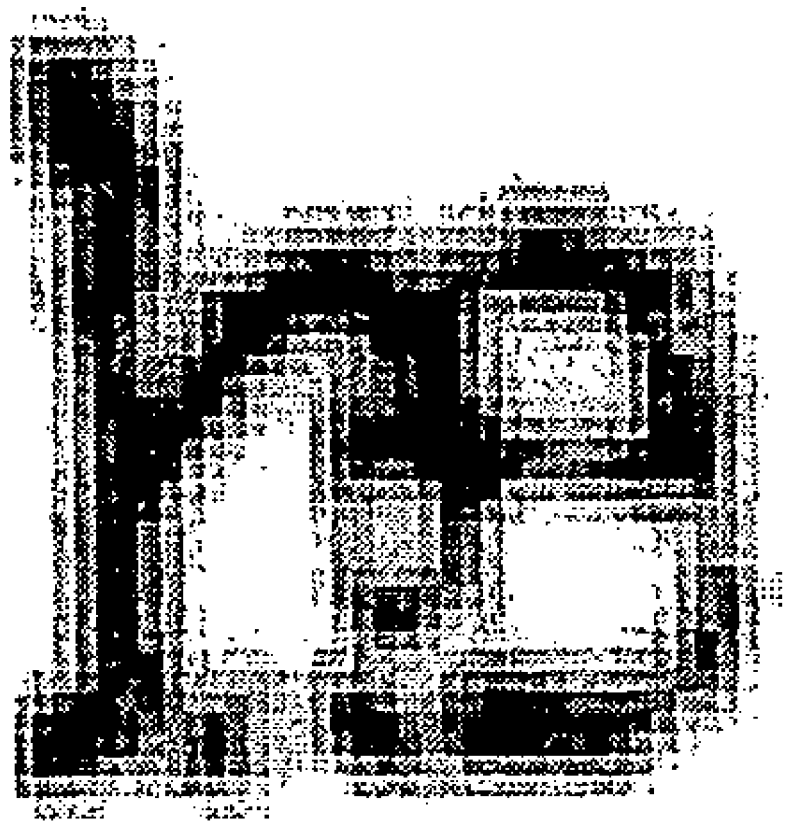
FIG. 3 illustrates an example of a bounding box comprising a double printed character image from the text in FIG. 1.

FIG. 1 illustrates how double printed characters may be encountered in a text printed by a typewriter. In an example used in this disclosure, the double printed image of h and e is used to illustrate the identification process according to the present invention. A set of template images is created as depicted in FIG. 2 comprising images of characters recognized by the OCR system having an image quality above a certain level, for example, having a score value above a predefined level. These template images are then used one at a time in a comparison process with a bounded image of the suspected double printed image, for example the h and e as illustrated in FIG. 3. The bounding box is provided around the imprint of the suspected double printed character from the position on the page where this suspected double printed image has been identified. Each respective template image is moved as a gliding image over the image in the bounding box in FIG. 3. The movement can for example be done with a step of one pixel at a time. For each step a correlation value is calculated and recorded. The correlation provides also information about the displacement or offset between character is images bodies between the respective the images being compared. These displacement values can be viewed as the amount of alignment in an x and y direction that is necessary to do when trying to place the two image bodies on top of each other such that as much as possible of the respective character bodies cover each other. The x and y values can be relative values indicating a movement respectively back and fourth and up and down relative to the bounding box, wherein the sign indicates the direction. These displacement values are also recorded together with the correlation value that has been calculated for each step. Table I illustrates an example Of calculated values for local maximum correlation and corresponding displacement (offset) values for single character template images from FIG. 2 being moved across the suspected double printed character image in FIG. 3.

TABLE I

| Char | Parallelism | Offset |
| --- | --- | --- |
| 'a' | 0.9276 | [−2, −1] |
| 'a' | 0.9292 | [−2, 11] |
| 'b' | 0.9564 | [0, −4] |
| 'c' | 0.9605 | [0, 1] |
| 'c' | 0.9596 | [−1, 13] |
| 'e' | 0.9329 | [0, −2] |
| 'e' | 0.9634 | [−1, 11] |
| 'h' | 0.9749 | [−1, −2] |
| 'i' | 0.9105 | [−1, −11] |
| 'k' | 0.9105 | [−2, −2] |
| 'l' | 0.9079 | [1, −10] |
| 'n' | 0.9657 | [0, −3] |
| 'n' | 0.9269 | [−1, 9] |
| 'o' | 0.9519 | [1, −2] |
| 'o' | 0.9399 | [0, 10] |
| 'p' | 0.9032 | [−2, −2] |
| 'p' | 0.9049 | [−2, 11] |
| 'r' | 0.9639 | [−1, −7] |
| 'r' | 0.9466 | [−1, 7] |
| 's' | 0.9336 | [−1, −2] |
| 's' | 0.9505 | [−2, 11] |
| 't' | 0.9261 | [1, −6] |
| 'u' | 0.9660 | [−1, −1] |
| 'u' | 0.9020 | [−1, 11] |

Figure 4:
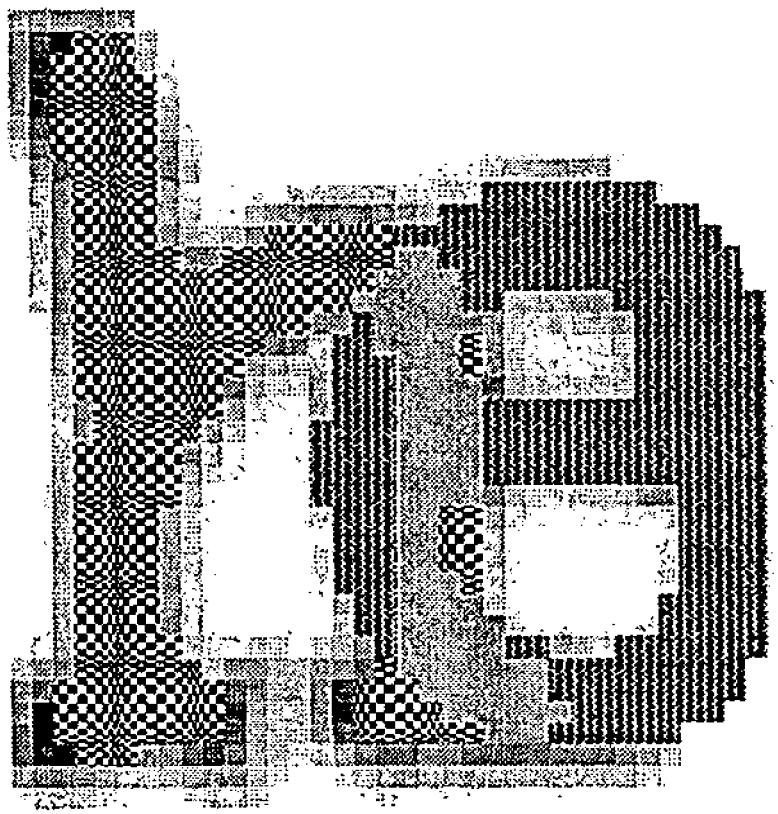
FIG. 4 illustrates the template image for the respective character h and e aligned on top of the image in FIG. 3.

As can be seen form the table, the gliding movement of a template image can provide for example two local maximum correlation values. This is due to the fact that there are more than one character in the double printed character image, and a template image can be placed in a local maximum overlapping position in at least two different positions corresponding to the two characters present in the double printed character image. According to an example of embodiment of the present invention, all combinations of single character templates and their identified displacement values are combined as candidates representing the suspected double printed character image. Then each of the respective combined single character template images are correlated one by one with the image of the suspected double printed character image. FIG. 2 illustrates an example of template images used when investigating the suspected double printed character image in FIG. 3 providing a maximum correlation of the combined h and e template as depicted in FIG. 4. The identification of the characters in FIG. 3 is then complete. According to another example of embodiment of the present invention, only template images with a correlation value above a predefined threshold level is used when combining the images.

The process of combining images according to the present invention comprises identifying contributing regions in each respective template image for the combined image. For example, the combined image of two displaced template images with corresponding bounding boxes will have 4 different region types, regions with contribution from only the first template bounding box and regions with contribution from only the second bounding box, regions with contributions from both bounding boxes and if the image is rectangular there might be regions where there are no contributions from either of the bounding boxes. Where there are only contributions from one template, the pixel value from the relevant template is chosen for the combined image, and where there contributions from both templates one chooses the darkest pixel value (grey level coded) of the two templates. The regions without contributions from any template are set to an appropriate background level.

The mathematical operation of correlation as such is known from prior art. However, the inventors of the present invention has discovered that a measure of parallelism (n dimensional measure of parallelism) between which pixels values comprised in the suspected double printed character image body that are "on", and corresponding pixel values that are "on" in the modelled template image body when they are aligned provides an improved measure of equality between the respective images. In an example of embodiment the measure is defined as:

$$\psi = \frac{\sum_{k=1}^{n} p_k p'_k}{\sqrt{\sum_{k=1}^{n} p_k^2 \cdot \sum_{k=1}^{n} p'^2_k}}.$$

wherein $p_k$ are the offset 'on' pixels in the suspected double printed character image and $p'_k$ the offset untouched 'on'-pixels in the combined modelled template image when aligned.

According to another aspect of the present invention, the template images can be identified as character images of a quality above a predefined level and/or as a super positioning of several images on top of each other representing the same character image, denoted as a character class.

According to an example of embodiment of the present invention, the following steps can be performed when creating character classes:

I. choosing randomly three samples in a class, correlating all the combinations of these three samples, and then selecting the pair of correlated images providing a correlation above a predefined threshold level as a starting point for a template for this character class, II. if none of the combinations of pairs selected in I provides a correlation above the threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used to be within a bounding box defined as the median size of the bounding boxes of a subset of images representing a majority of the images.

According to another example of embodiment of the present invention, the accumulation of aligned images into the template for a class representing a character, comprises further adding corresponding grey level pixel values from corresponding locations in the aligned images together such that each grey level pixel value is weighted with an inverse of the number of currently accumulated aligned images in the template image for the class before performing the addition.

In some instances, there will be missing character images in a template set or class according to the present invention. This would provide a situation wherein there is for example a missing template image. Such situations can occur for example if a character indeed is rarely used in the language of the document. For example, in Norwegian the character c is a rarely used character in contrast to other languages wherein c is the most common used character. A typical confusion alternative for the character c is the character e. It is reasonable to expect that there will be a template present for the character e, but probably not for the character c. When there is identified that a template is missing, a synthetic template image can be provided for on basis of an already existing template image that resembles the missing template image. In this way, some of the graphical attributes of characters as they are encountered in the document being processed by the OCR system will be part of the synthesized templates image.

The invention claimed is:

1. A method for resolving contradicting output data from an Optical Character Recognition (OCR) system, wherein the output data comprises at least one suspected double printed character image, the method comprises:
   a) searching through the output data identifying images of characters having an image quality above a predefined level, and using these character images as a set of single character template images for characters,
   b) providing a bounding box around the suspected double printed character image, and then doing a gliding single character image correlation between each respective single template image, one by one, and the suspected double printed character image, and recording the correlation values and corresponding displacement values of the respective character image bodies for each step of movement performed in the gliding single character correlation process,
   c) selecting single template images having a correlation values above a predefined threshold level to create a list of candidates of combined single character template images aligned relative to each other according to the their corresponding displacement values relative to the bounding box,
   d) correlating each respective candidate of combined single character template images with the suspected double printed character image, and selects the combined single character template image having the highest correlation value as an identification of each respective character image in the suspected double printed character image.

2. The method according to claim 1, wherein the correlation between the respective combined single template images and the suspected double printed character image is done by calculating a measure of equality as:

$$\psi = \frac{\sum_{k=1}^{n} p_k p'_k}{\sqrt{\sum_{k=1}^{n} p_k^2 \cdot \sum_{k=1}^{n} p'^2_k}}$$

wherein $p_k$ are the aligned 'on' pixels in the image of the suspected double printed character body, and $p'_k$ the aligned 'on'-pixels in the combined image of the single template bodies.

3. The method according to claim 1, wherein the step providing a template set comprises sorting all reported identified characters above the threshold level into classes, wherein each class represents the same identified character in the template set, and then performing the steps of providing images for each character or class in the template set by:

I. choosing randomly three samples in a class, correlating all the combinations of these three samples, and then selecting the pair of correlated images providing a correlation above a predefined threshold level as a starting point for a template for this character class, II. if none of the combinations of pairs selected in I provides a correlation above the threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used.

4. The method according to claim 3, wherein the accumulation of aligned images into the template for a class representing a character, further comprises adding corresponding grey level pixel values from corresponding locations in the aligned images together such that each grey level pixel value is weighted with an inverse of the number of currently accumulated aligned images in the template image for the class before performing the addition.

5. The method according to claim 3, wherein a situation when a character class is missing due to missing identified character images from the document being processed in the OCR system, a missing template class is synthesized from another existing template class resembling the missing template class.

\* \* \* \* \*